No. 893,434. PATENTED JULY 14, 1908.
L. H. BRINKMAN.
FLANGED METAL PIPE AND METHOD OF MAKING.
APPLICATION FILED JAN. 12, 1906.
2 SHEETS—SHEET 1.
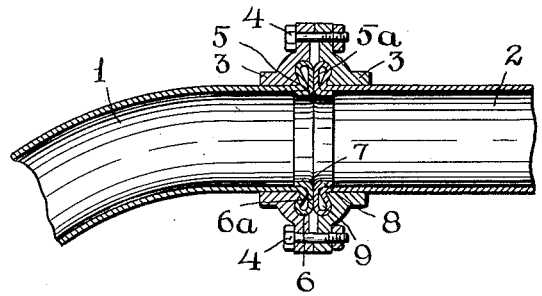
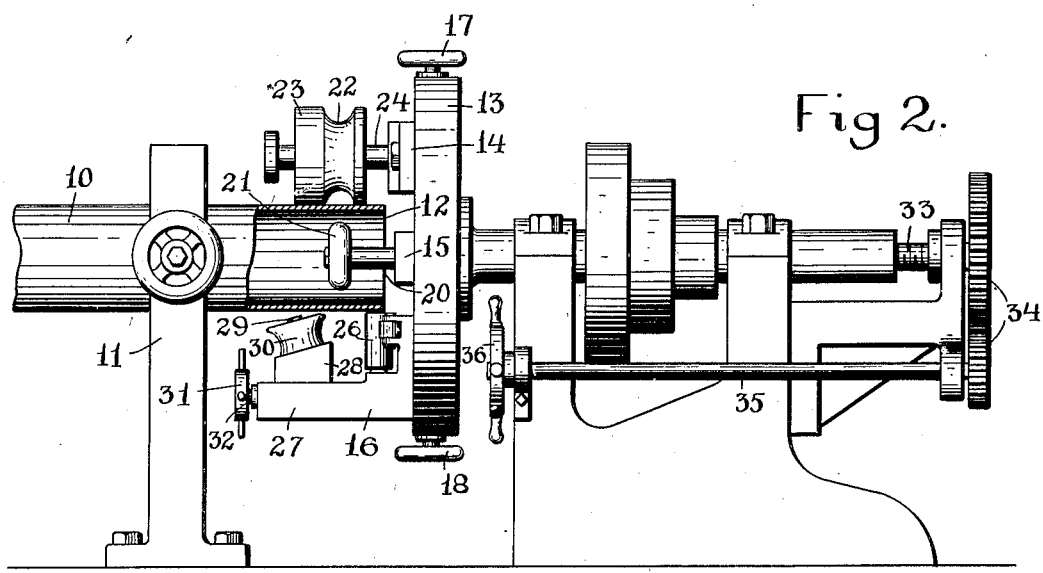
Witnesses
Roy D. Tolman.
Penelope Cumberbach.
Inventor
Louis H. Brinkman.
By Rufus B. Fowler
Attorney No. 893,434.   PATENTED JULY 14, 1908.
L. H. BRINKMAN.
FLANGED METAL PIPE AND METHOD OF MAKING.
APPLICATION FILED JAN. 12, 1906.

2 SHEETS—SHEET 2.

Witnesses
Roy D. Tolman.
Penelope Couberbach

Inventor
Louis H. Brinkman.
By Rufus B Fowler
Attorney

UNITED STATES PATENT OFFICE.

LOUIS H. BRINKMAN, OF HARTFORD, CONNECTICUT, ASSIGNOR TO WHITLOCK COIL PIPE COMPANY, OF WEST HARTFORD, CONNECTICUT, A CORPORATION OF CONNECTICUT.

FLANGED METAL PIPE AND METHOD OF MAKING.

No. 893,434.

Specification of Letters Patent.

Patented July 14, 1908.

Application filed January 12, 1906. Serial No. 295,742.

*To all whom it may concern:*

Be it known that I, LOUIS H. BRINKMAN, a citizen of the United States, residing at Hartford, in the county of Hartford and State of Connecticut, have invented a new and useful Improvement in Flanged Metal Pipes and Methods of Making, of which the following is a specification accompanied by drawings, forming a part of the same, in which—

Figure 5:
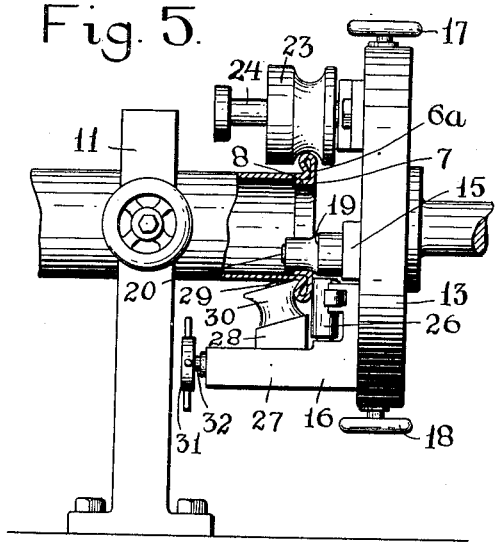
Figure 6:
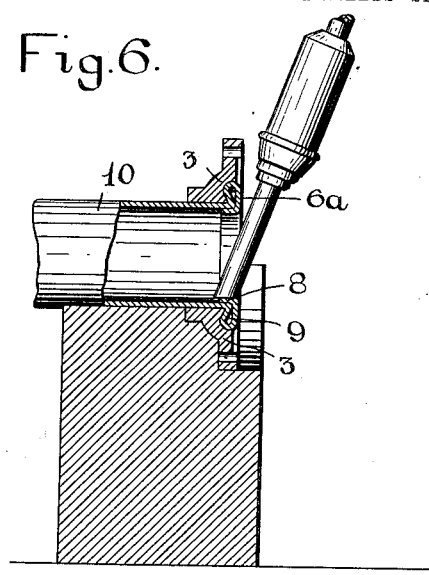
Figure 7:
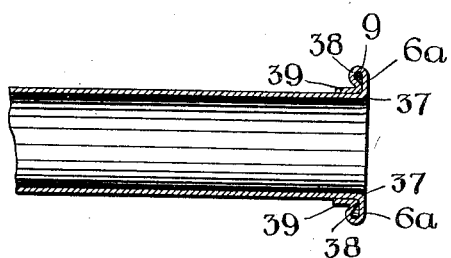
Figure 8:
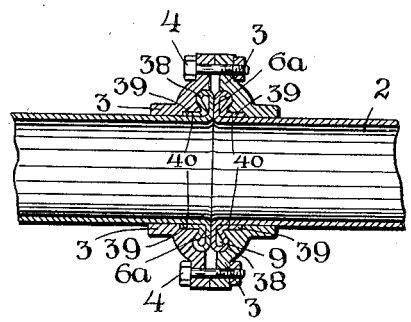

Figure 1 represents two coupled sections of pipe having opposing flanged ends embodying my invention. Fig. 2 is a side view of a pipe flanging machine, for producing a flanged pipe embodying my invention. Figs. 3, 4 and 5 are detailed views of the flanging mechanism, showing different steps of the process. Fig. 6 is a view of the mechanism used in welding the flange to the interior of the pipe. Fig. 7 represents a modified form of flange, and Fig. 8 represents two coupled sections of pipe with the flanged ends shown in Fig. 7.

Similar reference letters and figures refer to similar parts in the different views.

My present invention relates to an improved form of flange formed upon the ends of metal pipes which are to be coupled together, and to the method of making the same.

Referring to the accompanying drawings, 1, 2, denote two sections of pipe having their opposing ends flanged and coupled together by coupling collars 3, 3, and coupling bolts 4, 4.

My improved pipe flange is made by turning over the end of a pipe by a sharp bend at 5, 5, to form an outwardly turned member 5ª, returning the flange upon itself by an inward bend at 6, with the returned portion of the pipe lying in a plane at right angles to the axis of the pipe forming an inwardly turned member 6ª, turning the end of the flange by a right angle bend at 7 parallel to and inside of the pipe itself, and welding said parallel portion 8 of the flange to the pipe. I thereby leave an inclosed annular space 9 between the bend 5 and the inturned member 6ª of the flange and securely fasten the end 8 of the flange to the pipe itself. This forms a double flange with the inturned member 6ª on the adjacent ends of the pipes brought into contact and drawn together by the coupling collars 3 as shown in Fig. 1, said coupling collars being provided with opposing grooved faces adapted to receive and closely fit the outer surfaces of the flanges. As the opposing surfaces of the inturned members 6ª are brought into planes at right angles to the axes of their respective pipes, they form closely contacting surfaces when coupled together and dispense in ordinary cases with the use of gaskets. The end 8 of the flange being welded to the pipe renders the entire flange more rigid and also holds more securely the inturned members 6ª, so that, if required, the faces of the members 6ª may be milled or ground exactly parallel to each other and at right angles to the axis of the pipe and an absolutely tight fit obtained.

My improved pipe flange may be conveniently constructed as follows:—A section of pipe 10 to be flanged is held between clamping jaws supported by uprights 11 with the end 12 of the pipe presented to a revolving face plate 13. Diametric ways on the face plate are provided in which the blocks 14, 15 and 16 are fitted to slide. The block 14 may be fastened in any desired position in the ways on the face of the revolving plate 13, the block 15 may be moved radially by an adjusting screw turned by the hand wheel 17, and the block 16 is adjusted by the hand wheel 18. Held on a stud 20 carried by the block 15 is a roller 21 having a rounded periphery adapted to draw a portion of the pipe outward into an annular groove 22 of a roller 23, which is held loosely on a stud 24 carried by the block 14, as shown in Fig. 3. This shaping process expands the ends of the pipe and forms an internal semi-circular groove 25. When the groove 25 has been formed the roller 21 is removed from the stud 20 and the roller 19 shown in Fig. 5 is substituted; the grooved roller 23 is also removed radially out of the way as shown in Fig. 4. A roller 26 is journaled in the block 16 having its face at right angles to the axis of the face plate. The block 16 is also provided with a projecting arm 27 parallel with the axis of the face plate. Sliding in ways in said arm is a block 28 carrying a spindle 29 on which is journaled a roll 30 having a concave face, with its axis at an oblique angle to the axis of the face plate. The hand wheel 31 and screw 32 furnish means for adjusting the block 28 in the arm 27. When the roller 30 has been brought into close contact with the angle formed by the periphery of the pipe and its expanded end, as shown in Fig. 3, the face plate is fed along in its bearings toward the end of the pipe by means of a feed screw 33 which is revolved by gears 34, shaft 35, and hand wheel 36. This movement of the face plate toward the end of the shaft carries the roller 26 against the expanded end of the pipe, thereby bringing the inturned member of the flange into a plane at right angles with the axis of the revolving face plate and by the same operation forcing the outwardly turned member of the flange into contact with the concave side of the roll 30, which is also moved in the meantime so that it constantly remains in contact with the pipe, thereby shaping the outwardly turned member in conformity thereto. The movement of the face plate toward the pipe also brings the roller 19 inside the pipe and the roller 19 by the revolution of the face plate bends the end 8 of the flange at right angles at 7, thereby bringing it parallel to and in contact with the inside periphery of the pipe. During these operations the end of the pipe operated upon is rendered sufficiently plastic by heat to allow it to be easily shaped between the various rolls. The pipe is then removed from the flange bending machine and its end heated to a welding heat. The end 8 of the flange in contact with the inside periphery of the pipe is then subjected to the action of a pneumatic hammer as shown in Fig. 6, which welds that portion of the flange to the pipe. This greatly strengthens the flange which must of necessity be somewhat weakened by the expansion of the metal in the pipe composing the flange, and also holds securely the inturned member 6$^a$ of the flange at right angles with the axis of the pipe. This inturned member 6$^a$ may therefore be faced, so that a perfect fit between two abutting flanges may be obtained, and the inturned member when reduced in thickness by facing will be securely held at its outer edge by the outwardly turned member of the flange, and at its inner edge by the welded portion 8.

The presence of the annular space 9 at the outer edges of the flanges makes them of increased thickness which, fitting the grooved face of the clamping collars 3, 3, prevents the flanges from being pulled out of the collars by a longitudinal strain on the pipe.

In Fig. 7 I show a modified flange embodying my invention in which the end of the pipe is first bent at right angles at 37, the portion 38 is turned inwardly toward the pipe at an oblique angle and the end 39 of the flange is bent parallel with the axis of the pipe and contacts with the outside of the pipe. In this flange I avoid the necessity of welding the end 39 to the pipe as it will be securely held in contact with the pipe by the collar 3, the inside of which is fitted with an annular groove 40 to receive the end 39, as shown in Fig. 8. In this alternative flange I attain also the other advantages of my invention, such as the face 6$^a$, and the annular space 9 between the outwardly and inwardly turned sections of the flange.

What I claim as my invention and desire to secure by Letters Patent is:—

1. As an article of manufacture, a pipe having a flange near its end, said flange being turned outward at an oblique angle to the axis of the pipe, returned inwardly upon itself in a plane at right angles to the axis of the pipe, with its end bent parallel to and in contact with the inside of the pipe and fastened thereto.

2. As an article of manufacture, a pipe having a flange at its end integral with the pipe, composed of outwardly and inwardly turned sections, said sections being in contact with each other at the base of the flange, and with the end of the inwardly turned section parallel to and in contact with the periphery of the pipe.

3. As an article of manufacture, a pipe having near its end an external flange integral with the pipe, composed of an outwardly and an inwardly turned section, with the edge of the inwardly turned section bent inside the pipe and fastened thereto.

4. As an article of manufacture, a pipe having at its end an external flange integral with the pipe, comprising outwardly and inwardly turned sections, with the end of the inwardly turned section parallel with and fastened to the inside periphery of the pipe, and with the inwardly turned section accurately faced at a predetermined angle with the axis of the pipe.

5. As an article of manufacture, a pipe having a flange at its end integral with the pipe, comprised of outwardly and inwardly turned sections, with the end of the inwardly turned section bent in a plane parallel with the pipe and fastened thereto.

6. As an article of manufacture, a pipe having a flange at its end integral with the pipe, composed of outwardly and inwardly turned sections, with the end of the inwardly turned section bent in a plane parallel with the pipe and in contact with the pipe.

Dated this 5th day of January 1906.

LOUIS H. BRINKMAN.

Witnesses:
 ARTHUR F. THYLE,
 JOSEPH E. LEWIS.